Jan. 7, 1958 J. HITCHIN 2,819,022

CALCULATORS

Filed Nov. 30, 1954 3 Sheets-Sheet 1

INVENTOR

James Hitchin

BY Bryant & Lowry

ATTORNEYS

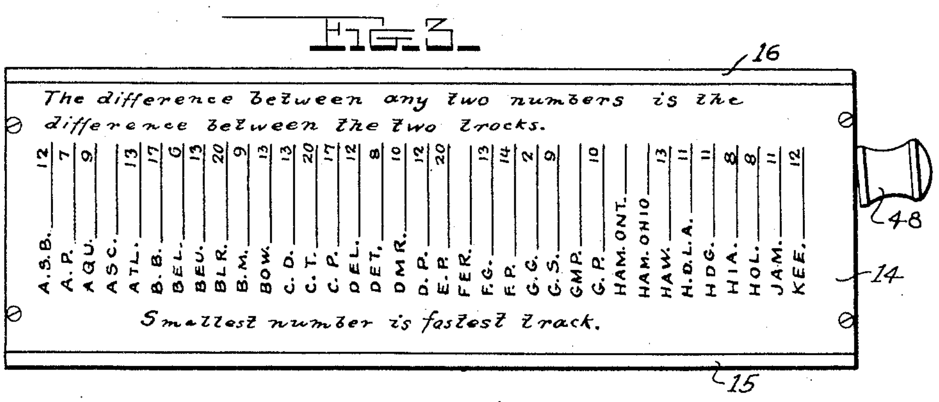
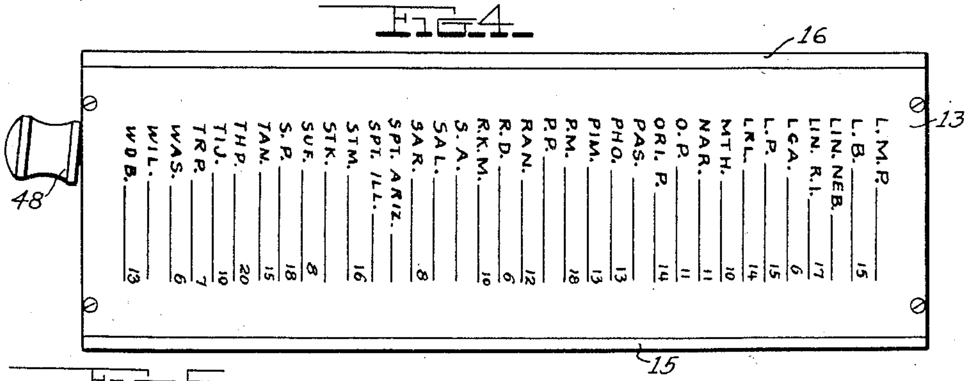
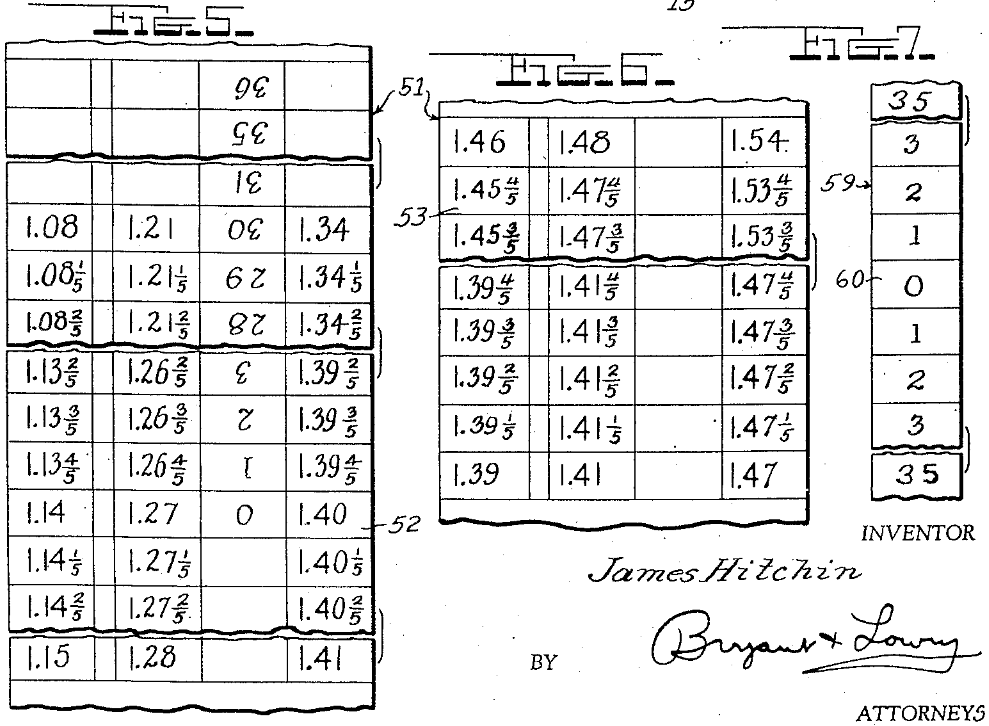
FIG. 3, FIG. 4, FIG. 5, FIG. 6, FIG. 7
INVENTOR
James Hitchin
BY Bryant & Lowry
ATTORNEYS Jan. 7, 1958 J. HITCHIN 2,819,022

CALCULATORS

Filed Nov. 30, 1954 3 Sheets-Sheet 3

INVENTOR

James Hitchin

BY Bryant & Lowry

ATTORNEYS

United States Patent Office 2,819,022 Patented Jan. 7, 1958

2,819,022

CALCULATORS

James Hitchin, San Diego, Calif.

Application November 30, 1954, Serial No. 472,111

6 Claims. (Cl. 235—86)

This invention relates to calculators and more particularly to calculators designed for use as an aid in determining the expected performance of race horses based upon past performance records.

In a given race at any of the duly licensed and legalized North American tracks, it is of interest to predict the expected performance of each of the entries in the race.

The actual performance of each of the entries involves a large number of factors. Many of these factors are highly variable and difficult to predict and at best may be weighed by the application of informed judgment. Examples of these are: conditions of the track at starting time of the race, the particular jockey who is riding a given horse, and physical injury to the horse which may materially affect its normal speed. However, there are certain of these factors which involve fixed and basic technical data, and which data must be considered in determining expected performance, and prior to the analysis of the more variable factors.

Several publications undertake to tabulate and provide the past performance data on each of the horses currently in active racing service. These publications list for each horse the races in which it has previously been entered. Included in the technical data furnished is the date of the race, the track on which the race was run, the time of the winning horse, the distance run, the position of the horse in question in lengths behind the leading horse at first call, pre-stretch and in stretch, and the beaten lengths at the finish relative to the winning horse.

From this data it is desirable to calculate the actual running time of the horse in question for each of its prior races, and also to determine a speed rating based upon the basic technical data of past performance in order to rate each of the horses in a given race relative one to the other.

It is possible to make such calculations by an arithmetical process by using the basic source data, but this operation is difficult, time consuming, readily subject to error and requires rather expert knowledge and handling of the data.

It is an object of this invention to provide a calculator by means of which the desired arithmetical results can be obtained from the basic source data by a simple manipulation of the reels of the calculator.

It is a further object of the invention to provide a calculator structure which is simple in form and inexpensive to manufacture and which may be quickly and easily operated by one unskilled in the mathematical steps necessary to reach the desired results from the basic technical data furnished.

Still another object of the invention is to provide a mechanical device which will completely eliminate any mental or written arithmetical steps in arriving at desired technical results.

A further object is to provide a device which is compact and easily carried on the person.

A further object of the invention is to provide a calculator which is versatile and the use of which may be extended to a variety of performance problems its versatility being commensurate with the skill of the user.

With the above and other objects in view as will be presently apparent, the invention consists in general of certain novel combinations of elements hereinafter fully described, illustrated in the accompanying drawings and specifically claimed.

In the accompanying drawings like characters of reference indicate like parts in the several views, and:

Fig. 3 is an elevational view of one side of the calculator upon which appears a chart disclosing the relative speed ratings of a number of the major North American tracks.

Fig. 4 is an elevational view of the opposite side of the calculator and providing the relative speed ratings of an additional number of the North American tracks.

Fig. 5 is a fragmentary view of portions of one face of the main calculator tape, showing the data which appears on said tape, said tape being shown in flattened position for the purpose of clear illustration.

Fig. 6 is a fragmentary view of the beginning and end portions of the opposite face of the main calculator tape, showing the data which appears on said tape.

Fig. 7 is a fragmentary view of the begining intermediate and end portions of one face of the small calculator tape, the tape being shown flattened for the purpose of illustration.

Figure 1:
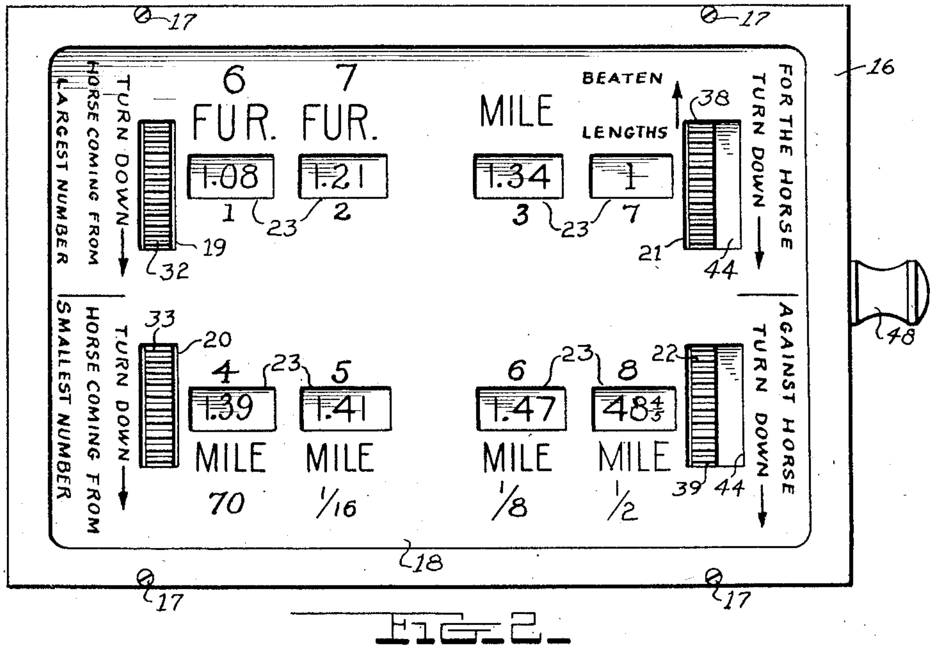
Fig. 1 is a top elevational view of the calculator which shows the device as it appears in use.
Figure 2:
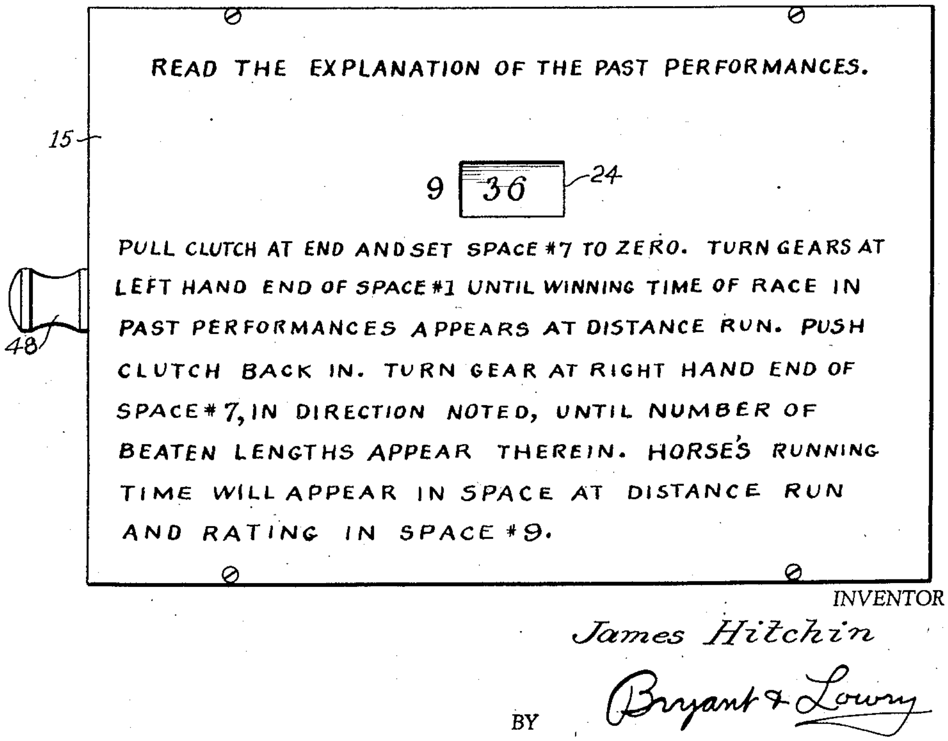
Fig. 2 is a bottom view of the invention as it appears in use and showing the window at which appears the speed rating of a given horse.
Figure 8:
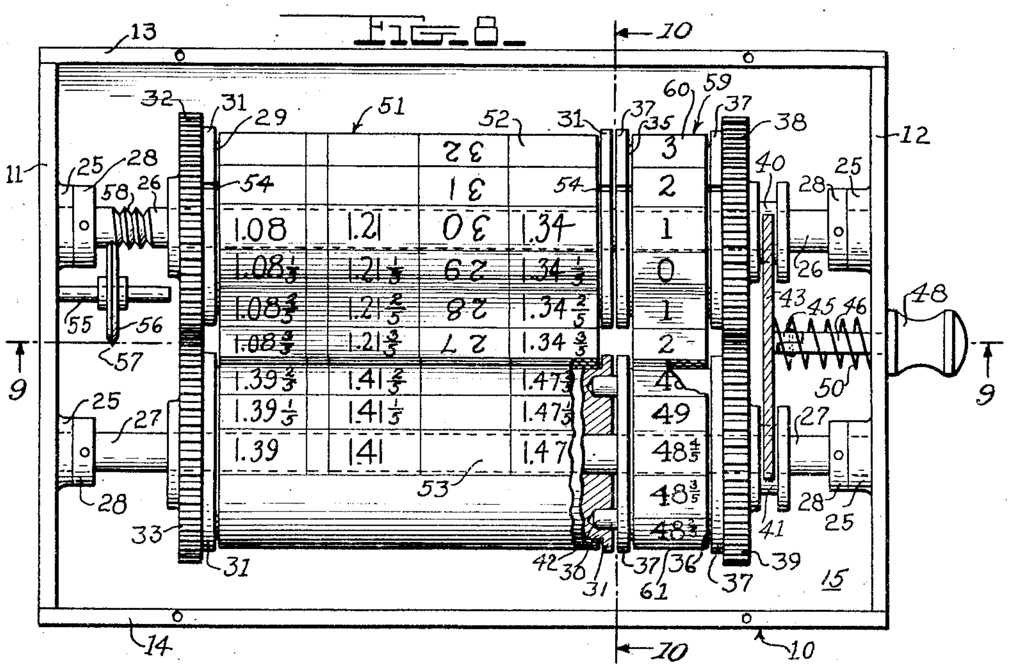
Fig. 8 is a top view of the calculator with the cover removed and showing the relative arrangement of the various mechanical parts, and with the top portion of the clutch plate broken away to better show the clutch structure.
Figure 9:
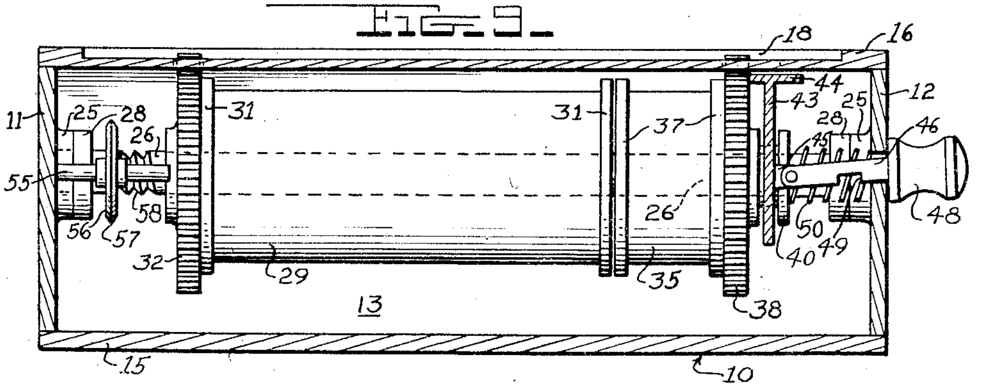
Fig. 9 is a cross-sectional view of the invention taken on the line 9—9 of Fig. 8.
Figure 10:
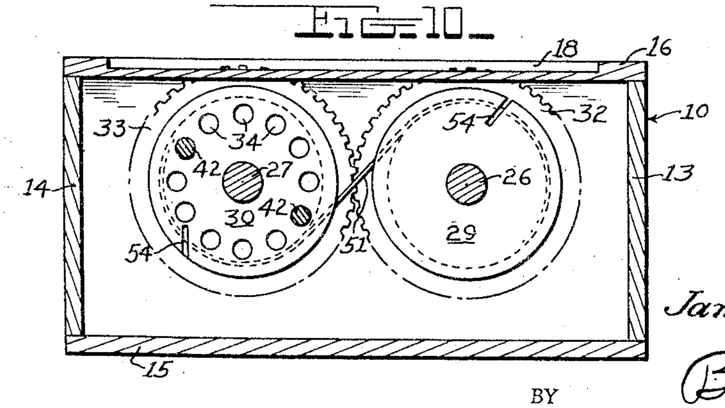
Fig. 10 is a cross-sectional view of the calculator taken on the line 10—10 of Fig. 8.

In the drawings the reference numeral 10 indicates the rectangular casing or housing in which the calculator mechanism is housed. This housing includes the end walls 11 and 12, the side walls 13 and 14, and the bottom plate 15.

A cover plate 16 is removably attached to the side walls of the casing by any means such as the screws 17 so that access will be provided for repair and maintenance of the inner elements. This cover plate may be provided with a recessed central portion 18 as shown.

The cover plate is provided with four transversely directed through apertures 19, 20, 21, and 22, through which project operating gears which will be later described. The apertures 21 and 22 are widened as shown to permit movement of the gears transversely of the aperture.

At predetermined position in the cover are formed the windows 23. Eight of said windows are provided and each of said windows has printed adjacent thereto an identification number, running consecutively from 1 through 8. Adjacent each of said windows 1, 2, 3, 4, 5, 6, and 8 is printed an abbreviation identifying the window as applying to a race of a standard distance. Specifically, window No. 1 indicates a 6 furlong race, window No. 2 a 7 furlong race, window No. 3 a mile race, window No. 4 a mile and seventy yards, No. 5 a mile and 1/16, No. 6 a mile and 1/8, and No. 8 a half mile. The significance of these designations will be later described.

Window No. 7 carries the printed designation "Beaten Lengths."

Adjacent the through apertures 19 and 20 are printed directional arrows and a brief indication of when each dial should be operated. Adjacent through apertures 21 and 22 are printed directional arrows and brief advisory indicia, the purpose of which is to be later described.

At a selected position on the bottom plate 15 is provided a through aperture or window 24 and this window is given the printed identification number 9. As will be later described, a rating number for a given horse will appear through said window. Adjacent said window No. 9 are printed brief directions for the basic use of the calculator.

On the side walls 13 and 14 are printed in two sections, using standard abbreviations, the major North American tracks and a rating number for each track. This number is a relative rating based upon the "speed" of the track and reflects the relative type of the track surfaces according to the policy of the particular track. This track speed rating provides basic data to be applied during use of the calculator.

At appropriately spaced distances on the end walls 11 and 12 of the casing 10 are positioned suitable bearings 25. Journalled in said bearings are the shafts 26 and 27. Adjacent the ends of each shaft and fixed thereto are the collars 28 which prevent endwise movement of the shafts. Another and preferred arrangement would be to drill bearing holes partially through the thickness of the end walls 11 and 12, thus eliminating bosses 25 and collars 28.

On the shaft 26 and fixed thereto is an elongated cylinder 29, and a cylinder 30 of identical size is fixed to the shaft 27. Each of the cylinders is provided with end guide flanges 31.

At one end of the cylinder 29 is affixed the gear 32 and a similar gear 33 is affixed to the corresponding end of the cylinder 30. These gears intermesh and their peripheral edges project through the apertures 19 and 20, as shown.

In the inner end wall of the cylinder 30 are drilled a plurality of evenly and circumferentially spaced holes 34 of relatively shallow depth.

On the shaft 26 adjacent the cylinder 29 is positioned a relatively short cylinder 35, and a short cylinder 36 of identical size is placed in a corresponding position on the shaft 27. These cylinders are also provided with end guide flanges 37.

A gear 38 is fixed to the end of the cylinder 35 and a gear 39 of similar size is fixed to the end of the cylinder 36, these gears meshing as shown and having their peripheral edges projecting through the apertures 21 and 22 in the top cover.

Each of the gears 38 and 39 is provided with the grooved hubs 40 and 41, respectively.

It should be pointed out that the unit formed of the cylinder 35, gear 38 and hub 40 is freely rotatable and slidable on the shaft 26, and the same is also true of the unit formed by the cylinder 36, gear 39 and hub 41 on the shaft 27.

On the inner end wall of the cylinder 36 are provided a plurality of circumferentially spaced teeth 42, and these are spaced and sized so as to cooperate with the holes 34 in the end of the cylinder 30.

An elongated plate 43, the opposite ends of which are notched, is positioned between the shafts 26 and 27 with the notches riding in the grooves of the hubs 40 and 41. If desired, a transverse member 44 may be formed at the top edge of the plate 43 to form a partial closure for the relatively wide apertures 21 and 22 when the cylinders 35 and 36 are slid inwardly for the maximum distance.

Substantially at the mid-point of the plate 43 is fixed an outwardly projecting boss 45. Pivotally attached to the boss 45 is an arm 46. This arm 46 projects through an aperture 47 in the end wall 12 of the casing and is provided with a head 48 and a notch 49 on its lower edge. A coil spring 50 encircles the arm 46 and boss 45 and one end thereof rests against the plate 43 and the opposite end rests against the side wall 12, the compressive force of the spring normally tending to bias the cylinders 35 and 36 against the cylinders 29 and 30, engaging the teeth 42 in the holes 34.

It will be seen that by pulling the knob 48 outwardly, the plate 43 will likewise be moved outwardly, carrying the cylinders 35 and 36 also outwardly, and disengaging the teeth 42 from the holes 34. By then depressing the arm 46 the notch 49 may be made to engage the edge of the aperture 47, thus locking the assembly in the outer position.

An elongated flexible strip 51 is wound on the cylinders 29 and 30 and it will be noted that the free ends of the strip are wound in opposite directions so that as the strip unwinds from one roll it will be taken up by another. It will also be noted that this has the effect of exposing opposite faces of the strip 51, one face 52 being exposed on the cylinder 29 and the opposite face 53 on the cylinder 30. Angled grooves 54 in the two cylinders 29 and 30 are provided for securely fastening the opposite ends of the strip 51.

In order to limit the travel of the strip 51 in either direction, there is provided a thread brake. This brake includes an inwardly directed shaft 55 which is fixed to the end wall 11 of the casing 10. A disc 56 is slidably and rotatably positioned on the shaft 55, and is provided with a sharpened edge 57 which rides in a thread groove 58. The thread groove 58 is so designed that jamming will occur after a limited movement of the strip in either direction, and thus the operator may not unwittingly over-wind the strip 51 so as to pull it from the grooves in the cylinders.

Only one thread brake is shown but it is to be understood that a similar brake could also be provided for the cylinders 35 and 36, by elongating and thread-grooving the hub 40.

On the cylinders 35 and 36 is placed a strip 59 which is similarly placed to the larger strip 51. This strip has a face 60 exposed on the cylinder 35 and a face 61 exposed on the cylinder 36.

On the first column of face 52 of the strip 51 is placed in increments of ⅕ of a second values ranging between the maximum and minimum times for a 6 furlong race.

In the second and fourth columns are provided similar values for the seven furlong and mile races. Each column is read through the appropriately marked windows 1, 2, or 3.

On the opposite face 53 are provided tables showing similar times for the mile and 70 yards, mile and 1/16 and mile and ⅛ respectively, and these are read through appropriate windows 4, 5 and 6.

For each race distance there are 36 time increments. In column 3 of face 52 are a series of numbers ranging from 0 through 36 and these are read through the window No. 9 on the back plate 15. For the slowest time for any one of the distances the number "1" will appear through the back window and a new number appears for each increment of ⅕ second. The numbers 1 through 36, therefore, constitute speed ratings for a horse for a race of a given distance. On a mathematical basis alone, the rating number compares the relative speed of horses for any distance.

The face 60 of the strip 59 carries two series of consecutive numbers from 0 through 35, running in opposite directions from the "0." These represent "beaten lengths" and this table is based upon the assumption universally adopted in racing that a beaten length represents ⅕ of a second.

On the opposite face 61 of the strip 59 is provided a table ranging in increments of ⅕ second from 49 through 42. When "0" appears in window No. 7, then "49" will appear in window No. 8.

The most simple and basic operation of the calculator is as follows:

It is desired to determine the running time of horse A for a mile race and also determine a speed rating. The past performance publications indicate that the winning time for the prior mile race was 1.39⅘. It also indicates that horse A finished 3rd and that he finished 3 lengths behind the winner.

The knob 48 is pulled out to disengage the teeth 42 from the holes 34, and locked by the notch 49, so that the strips 51 and 59 may be separately rotated. Gears 32 or 33 are then rotated with the fingers until the time 1.39⅘ appears in window No. 3. Gears 38 or 39 are then rotated until "0" appears in window No. 7. The arm 46 is then tilted until the notch 49 is freed from the edge of the aperture 47 and the teeth 42 re-engage the cylinders 30 and 36. Gear 39 is then turned downwardly until the number "3" appears in window No. 7. The time of horse A for the prior race then appears in window No. 3 as 1.40⅖. The rating number for horse A appears in window No. 9 as "4".

Assume that horse B ran in a prior 7 furlong race in which the winning time was 1.26⅘. The past date indicates that horse B was beaten by six lengths. The time 1.26⅘ is dialed in window No. 2. Gear 38 is dialed to "0" and the clutch engaged. Gear 39 is then turned down until "6" appears in window No. 7. The time for horse B is read in window as 1.28. The speed rating as read in window No. 9 is "1". On the basis of past performance data alone, horse A has a higher performance rating than horse B and should out-perform horse B in the race in question.

It may be seen that by translating other factors, such as the speed rating of the track of the prior race relative to the speed rating of the track under consideration, into equivalent beaten lengths, that correction may be made for such a factor by adjusting the beaten length strip accordingly. This will in turn affect the speed rating of the horse under analysis. Thus, the present invention is exceedingly versatile and a skillful operator can apply it to an endless number of performance problems.

The table provided on face 61 of strip 59 is used for determining a horse's condition by using the fractional times from official published race results.

An example of the use of this table is as follows:

The knob 48 is pulled outwardly to disengage the clutch. If the race is a 6 furlong race, then gear 32 is turned until 1:13 appears in window No. 1. At a constant speed, this is the time at 6 furlongs which corresponds to 49 seconds at 4 furlongs or ½ mile. The gear 38 is then turned until the tape in window No. 7 reads "0" and in window No. 8 reads "49." The knob 48 is then released to engage the clutch and cylinders 30 and 36. Gear 39 is then turned until the ½ mile time of the race being analyzed appears in window No. 8. A number then appears in window No. 7 and this is recorded or memorized.

The next step is to turn gear 32 if necessary until the 6 furlong time of the race being checked appears in window No. 1. If it is necessary to turn gear 32 and the time number in window No. 7 is the same as the time number of ½ mile, which was previously noted, then the horse is running a steady race. If the time number for the ½ mile is smaller than the time number for 6 furlongs, the horse is closing faster, and if conversely, the horse is losing speed.

A more specific example is as follows: Horse A has a listed time at the ½ mile point of a given race as 48 seconds. The clutch is first uncoupled; gear 32 is turned until 1:13 apears in window No. 1. Gear 22 is turned until 49 appears in window No. 8. The clutch is then coupled. Gear 22 is turned until the ½ mile time of 48 appears in window No. 8. A speed rating number of 5 then appears in window No. 7.

Assume that the clocked time for horse A at 6 furlongs is 1:12. No change of gear 32 is necessary for as gear 22 was moved to bring "48" into window No. 7, the tape at window No. 1 changed from 1:13 to 1:12. The speed number thus remains the same and the horse is running a steady race. If the 6 furlong time, however, is recorded in the performance sheet at 1:13⅖, it will be necessary to move gear 32 until this reading appears in window No. 1. The speed rating in window No. 7 will then appear as "12" and this is larger than 7, indicating the horse faded rapidly. If the recorded time for 6 furlongs, however, is 1:11⅗, gear 22 will be moved until this time appears in window No. 1. Window No. 7 will then read "3" and this speed number is less, indicating that the horse closed strongly. Thus, by using the furnished times for horse A at the ½ mile and 6 furlong points, the calculator will indicate without outside computation whether the horse held steady, faded or finished strongly.

While there is herein shown and described the preferred embodiment of the invention, it is nevertheless to be understood that certain modifications may be made therein without departing from the spirit and scope of the invention as claimed.

What is claimed is:

1. In a device for calculating the expected performance of a race horse based upon past performance records, a tape having printed thereon running times for a race of a given distance in increments of one-fifth of a second, means to move said tape past an indicating point, a second tape having thereon a series of numbers in sequence representing beaten lengths, means to separately move said second tape past an indicating point, and means for selectively coupling said tapes for simultaneous movement, whereby when said first tape is moved until the winning time of a given race appears at its indicating point, said second tape is separately moved until zero appears at its indicating point, the said tapes are coupled, and the second tape is then moved until its indicating point reflects the number of lengths by which a given horse was beaten, the first tape at its indicating point will give the running time of said horse.

2. In a device for calculating the expected performance of a race horse based upon past performance records, a tape having printed thereon running times for a race of a given distance in increments of one-fifth of a second, means to move said tape past an indicating point, a second tape having thereon a series of numbers in sequence representing beaten lengths, means to separately move said second tape past an indicating point, and clutch means for selectively coupling said tapes for simultaneous movement past their indicating points, whereby when said first tape is moved until the winning time of a given race appears at its indicating point, said second tape is separately moved until zero appears at its indicating point, the said tapes are coupled, and the second tape is then moved until its indicating point reflects the number of lengths by which a given horse was beaten, the first tape at its indicating point will give the running time of said horse.

3. In a device for calculating the expected performance of a race horse based upon past performance records, a tape having printed thereon a series of tables giving running times for races of varying standard distances in increments of one-fifth of a second, means to move said tape past a plurality of separate indicating points, one point being provided for each table, a second tape having thereon a series of numbers in sequence representing beaten lengths, means to separately move said second tape past an indicating point, and means for selectively coupling said tapes for simultaneous movement, whereby when said first tape is moved until the winning time of a given race of a given distance appears at its indicating point, said second tape is separately moved until zero appears at its indicating point, the said tapes are coupled, and the second tape is then moved until its indicating point reflects the number of lengths by which a given horse was beaten, the first tape at the selected indicating point for the distance will give the running time of said horse.

4. In a device for calculating the expected performance of a race horse based upon past performance records, a tape having printed thereon a table of running times for a race of a given distance in increments of one-fifth of a second, said tape further having thereon a table of speed rating numbers in numerical sequence, one number for each speed increment, means to move said tape past indicating points for each of said tables, a second tape having thereon a series of numbers in sequence representing beaten lengths, means to separately move said second tape past an indicating point, and means for selectively coupling said tapes for simultaneous movement, whereby when said first tape is moved until the winning time of a given race appears at its indicating point, said second tape is separately moved until zero appears at its indicating point, the said tapes are coupled, and the second tape is then moved until its indicating point reflects the number of beaten lengths by which a given horse was beaten, the first tape at one indicating point will give the running time of said horse and at the second indicating point the speed rating of said horse.

5. In a device for calculating the expected performance of a race horse based upon past performance records, a tape having printed thereon a series of tables giving running times for races of varying standard distances in increments of one-fifth of a second, said tape further having thereon a second table of speed rating numbers in numerical sequence, one number for each speed increment, means to move said tape past a plurality of indicating points, one point being provided for each table, a second tape having thereon a series of numbers in sequence representing beaten lengths, means to separately move said second tape past an indicating point, and means for selectively coupling said tapes for simultaneous movement, whereby when said first tape is moved until the winning time of a given race of a given distance appears at its indicating point, said second tape is separately moved until zero appears at its indicating point, the said tapes are coupled, and the second tape is then moved until its indicating point reflects the number of lengths by which a given horse was beaten, the first tape at one indicating point will give the running time of said horse and at the second indicating point the speed rating of said horse.

6. In a device for calculating the expected performance of a race horse based upon past performance records, a tape having printed thereon a series of tables giving running times for races of varying standard distances in increments of one-fifth of a second, means to move said tape past a plurality of separate indicating points, one point being provided for each table, a second tape having thereon a table including a series of numbers in sequence representing beaten lengths and a second table having printed thereon race running times for a distance of one-half mile in increments of one-fifth of a second, means to separately move said second tape past a pair of indicating points, one for each table, and means for selectively coupling said tapes for simultaneous movement.

References Cited in the file of this patent

UNITED STATES PATENTS

| | | |
|---|---|---|
| 203,763 | Patterson | May 14, 1878 |
| 426,010 | Hagemann | Apr. 22, 1890 |
| 1,136,673 | Heron | Apr. 20, 1915 |
| 1,169,300 | Tilly | Jan. 25, 1916 |
| 1,591,448 | Waite | July 6, 1926 |
| 2,530,191 | Clouez | Nov. 14, 1950 |

FOREIGN PATENTS

| | | |
|---|---|---|
| 581,874 | Great Britain | Oct. 28, 1946 |